United States Patent

[11] 3,602,101

| [72] | Inventors | Erich Jablonsky<br>Schwabisch Gmund;<br>Dieter Elser, Bobingen (Rems), both of,<br>Germany |
|---|---|---|
| [21] | Appl. No. | 887,100 |
| [22] | Filed | Dec. 22, 1969 |
| [45] | Patented | Aug. 31, 1971 |
| [73] | Assignee | Zahnradfabrik Friedrichshafen,<br>Aktiengesellschaft<br>Friedrichshafen, Germany |
| [32] | Priority | Dec. 21, 1968 |
| [33] | | Germany |
| [31] | | P 18 16 295.3 |

[54] AUXILLIARY POWER STEERING, ESPECIALLY FOR MOTOR VEHICLES
20 Claims, 11 Drawing Figs.

[52] U.S. Cl. .................................................. 91/422,
91/434, 91/437
[51] Int. Cl. .......................................................F15b 11/08,
F15b 13/14
[50] Field of Search............................................ 91/370,
371, 372, 373, 376, 378, 422, 434; 180/79.2

[56] References Cited
UNITED STATES PATENTS

| 2,063,937 | 12/1936 | Kundig | 91/434 |
| 2,922,440 | 1/1960 | Hardy et al. | 91/434 |
| 2,975,764 | 3/1961 | Jablonsky | 91/370 |
| 3,094,010 | 6/1963 | Folkerts | 91/372 |

*Primary Examiner*—Paul E. Maslousky
*Attorney*—Albert M. Zalkind

ABSTRACT: A power-steering device using hydraulic pressure is provided of very compact construction utilizing a ball nut on a steering spindle worm disposed in a pressure piston wherein the ball nut is housed within the piston and actuates a spool valve which controls pressure to and from both ends of the piston. The valve itself is carried in the piston transversely of the axis and displaced radially therefrom and driven by an actuator connection with the ball nut. The device has a housing providing suitable flow passages for pressure feed and exhaust from the valve, the piston having elongated longitudinal passages, among others, which maintain flow communication with housing passages at all positions of the piston.

INVENTOR
Erich Jablonsky
Dieter Elser

ATTORNEY

INVENTOR
Erich Jablonsky
Dieter Elser

ATTORNEY

AUXILLIARY POWER STEERING, ESPECIALLY FOR MOTOR VEHICLES

The invention is particularly applicable to trucks in which the driver's cabs are tilted in order to provide access to the engine. In such trucks, the amount of space allocatable for power steering mechanisms is extremely small, particularly the distance between the steering gear shaft and the steering spindle connection, in order that the universal joint in the steering spindle column provided to effect pivoting of the column when the cab is tilted, coincides with the tilt axis of the cab. Conventional construction of power-steering devices requires too great an overall length for purposes of trucks of this type and introduce design complications. The present invention solves the problem in a unique and practical manner in a construction wherein all essential components are carried by the booster piston insofar as pressure and oil flow control is concerned. In particular, by providing a piston which carries the control valve within the confines of the piston, as well as an actuating ball nut, there is a considerable saving in space. The construction is such that actuation of the control valve is effected between predetermined limits for steering in either direction and wherein centralizing or neutral positioning of the valve is automatically accomplished at the termination of any steering movement.

A detailed description of the invention now follows in junction with the appended drawing in which:

FIG. 10 is a section on the line X—X of FIG. 6 restricted to a showing of the valve spool.

Figure 1:
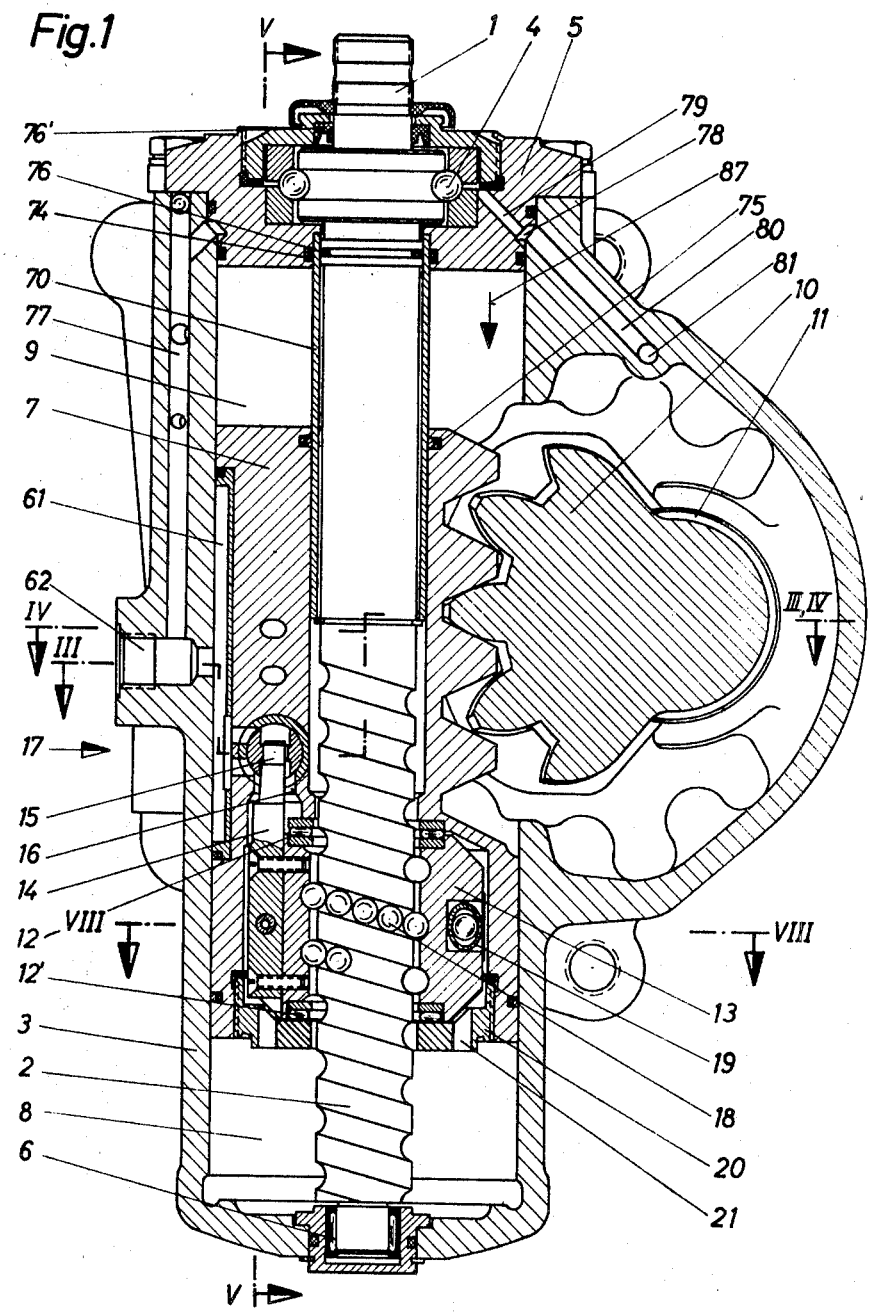
FIG. 1 is a longitudinal cross section of one construction of the invention.

Referring to FIG. 1, the invention comprises the steering spindle 1, which will be understood to show an outer end for connection to a steering column, which spindle has a threaded groove or worm 2 for ball drive connection of a ball nut 13. The entire mechanism is contained within a closed housing 3, wherein the steering worm 2 is supported at the spindle end in a bearing 4 suitably carried in an end cap 5, secured to the housing. The other end of steering worm 2 is socketed in a bearing 6 carried at the opposite end of the housing, as shown. The housing effects a double-acting cylinder for a pressure boost piston 7 having respective ends facing into cylinder pressure chambers 8 and 9. The piston is provided with the usual gear rack coacting with gear sector 10, which will be understood to drive the steering gear shaft 11 for actuating a steering mechanism, not shown. The gear sector is exposed within pressure chamber 9 and, therefore, it will be understood that shaft 11 is suitably sealed at its ends, as later described.

Piston 7 carries a pair of thrust bearings 12 and 12' between which is disposed a ball nut 13, which carries a valve actuator, an elongated member 14, which is disposed parallel to the axis of the construction, i.e., the cylinder, piston and ball nut 13. Actuator 14 has a drive finger 15 which extends through a bore 16 in the wall of piston 7 and has an upper extremity engaged in a pressure control valve 17 for actuation thereof. The bore 16 has a somewhat larger diameter than the portion of finger 15 passing therethrough to serve as a limit stop to finger movement. Thus, the ball nut 13 has a translational driving connection via balls 18 and ball return tube 19 with steering worm 2 in a well understood manner. However, the ball nut 13 also has slight rotational play around the axis of worm 2 to the extent permitted by the portion of finger 15 which passes through bore 16, due to the slightly larger diameter of bore 16. Accordingly, if the steering worm 2 be rotated, it will initially effect rotation of ball nut 13 therewith, in either direction into or out of the plane of the paper as viewed on FIG. 1 until such rotation is stopped by engagement of the portion of finger 15 with one side or the other of bore 16. It will be noted that ball nut 13 has no axial movement within piston 7, being secured against axial movement by thrust bearings 12 and 12' retained in assembly by a ring 20 threaded into the end of the piston. Ring 20 is provided with flow passage bores 21 for a purpose later explained.

Figure 5:
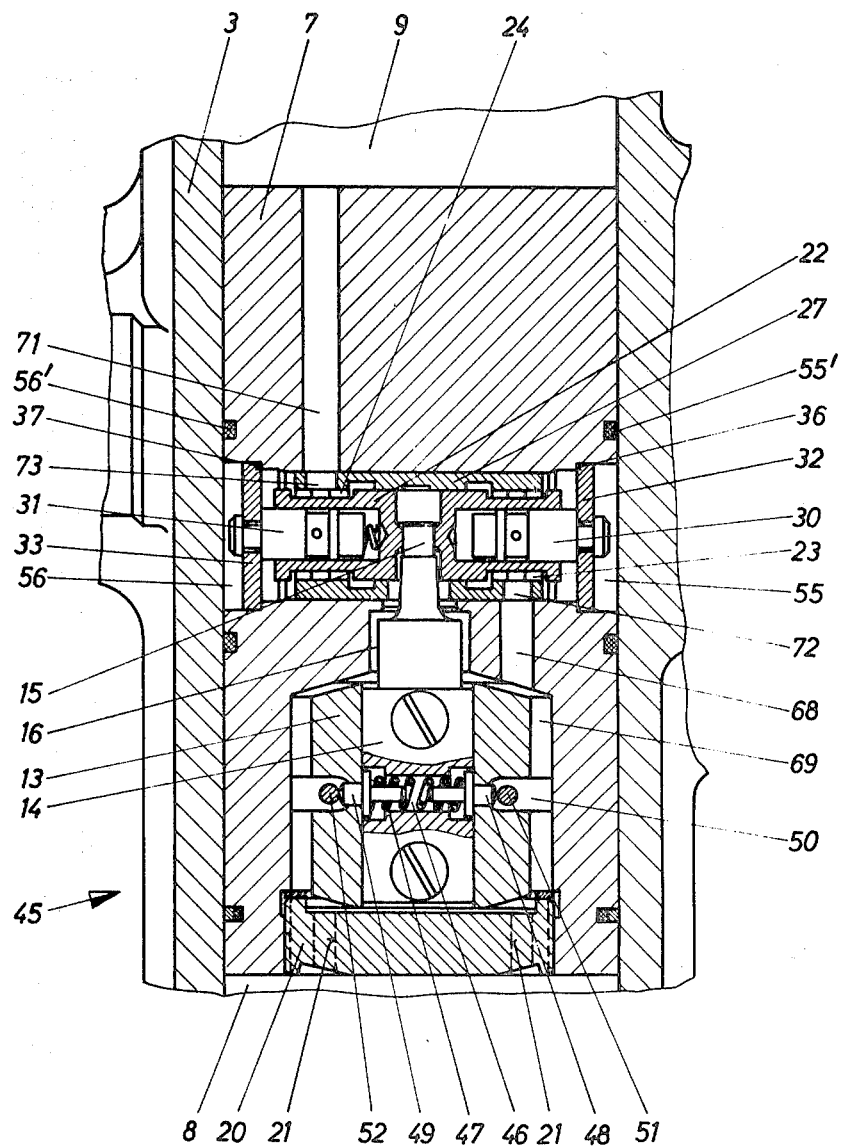
FIG. 5 is a section to a somewhat larger scale on the line V—V of FIG. 1.

From the description thus far it well be apparent that rotation of the steering spindle will swing actuator 14 toward or away from the viewer as seen in FIG. 1, and by referring to FIG. 5, it will be noted that the extremity of finger 15 of actuator 14 can move left or right (also see FIG. 6) to shift a reciprocal valve spool 22 of the pressure control valve 17 within a valve sleeve 27, which forms part of control valve 17 and which sleeve is secured in piston 7 in a bore transversely of the axis and radially spaced therefrom.

The valve spool is provided with a radial bore 25 for the driver end 15 of actuator 14 and such bore is slightly widened to allow play (see FIG. 6) radially for finger 15 in moving in an arc within bore 25.

Valve spool 22 is provided with grooves 23 and 24 which have slotted or perforate rings 26 so that oil can pass readily into and out of each groove, but at the same time, spool 22 is maintained in proper alignment and slidingly supported in valve sleeve 27 by rings 26.

The bore in piston 7 which carries valve 17 connects with longitudinal grooves 55 and 56 (FIGS. 1, 4 and 7) sealed by sealing rings 55' and 56' which face at the exterior surface of piston 7 and provide a sealing and sliding fit within the cylinder in which the piston reciprocates.

Spool valve 22 is provided with axial bores 28 and 29 for respective reaction pistons 30 and 31 which are secured by respective half disks 32 and 33 (FIGS. 3 and 6), to piston 7 by means of respective screws 34 and 35, wherein the half disks are thus held against shoulders 36 and 37 respectively, as seen in FIG. 5. The reaction pistons 30 and 31 have respective axial bores 38 and 39 (FIG. 6), which latter bores connected to respective radial bores 41 and 43 in the reaction pistons in turn communicating via the external grooves shown on the reaction pistons in FIG. 6 with respective radial bores 40 and 42 through the wall of valve spool 22 to communicate respectively with valve spool grooves 23 and 24. Accordingly, pressure in grooves 23 and 24 will be manifest inside respective reaction piston 30 and 31 to act against the adjacent ends of valve spool 22, bores 28 and 29. This provides simulated steering resistance.

A spring 44 is disposed in axial bore 38 to hold the valve spool 22 in contact with finger 15.

Owing to the play permitted of actuator 14 before engagement of finger 15 at one side or the other in bore 16, the position of ball nut 13 is not inherently set for straight-ahead steering. Accordingly, referring to FIGS. 5 and 8, a centering mechanism 45 is provided which provides a predetermined initial position of ball nut 13 and therefore of control valve 17 for a neutral steering position. Thus, the actuator 14 (FIG. 8) has a bore 46 in which is disposed a spring 47 having a predetermined degree of compression independently at each end due to the shoulders in bore 46, retainer pins 48 and 49 receiving the spring forces. The pins extend into a peripherally internal piston groove 50 to abut the conical ends of adjusting screws 51 and 52, threadedly carried radially by piston 7 and secured in adjusted position by respective jam nuts 53 and 54. By suitable adjustment of screws 51 and 52, it will be apparent that ball nut 13, and thus control valve 17, can be set to a neutral position. Any tendency of rotation of ball nut 13, for example, toward the right as viewed in FIG. 8, will cause retainer pin 49 to push against screw 52, thereby compressing the respective end of spring 47 to return ball nut 13 to its initial position. Similarly, any rotation of ball nut 13 in the opposite direction will effect compression through the retainer pin 48 and to restore the central position.

From the foregoing, it will be understood that a rotation of the ball nut will, upon release of manual steering force, result in the ball nut being restored to a central or neutral position effecting straight-ahead steering by centralizing control valve 17, i.e., valve spool 22, by virtue of the fluid passage control arrangement to be described.

Figure 4:
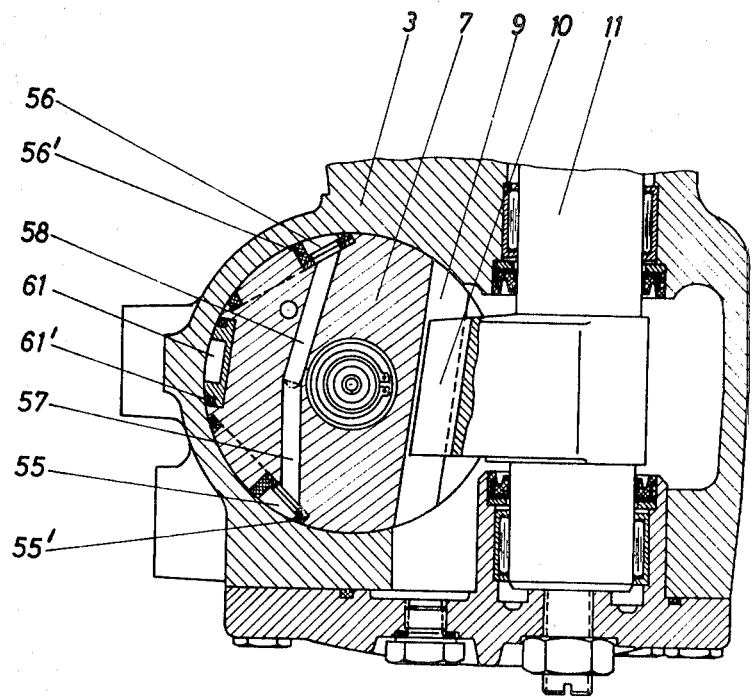
FIG. 4 is a section on the line IV—IV of FIG. 1.
Figure 6:
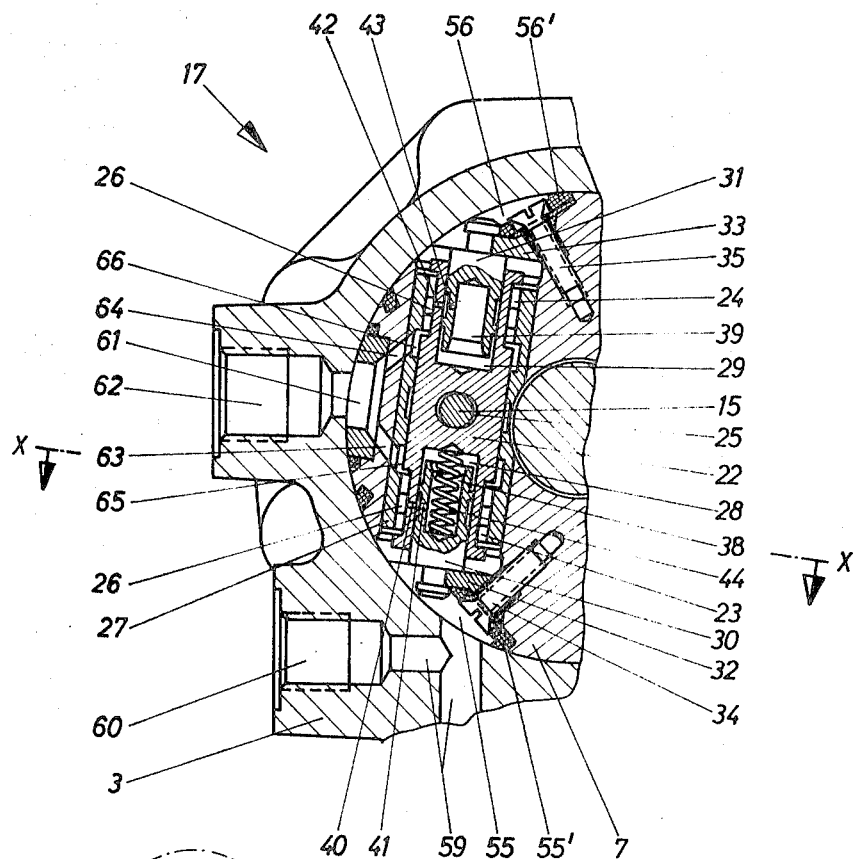
FIG. 6 is a fragmentary radial section through the piston and an axial section through the control valve of the invention.
Figure 7:
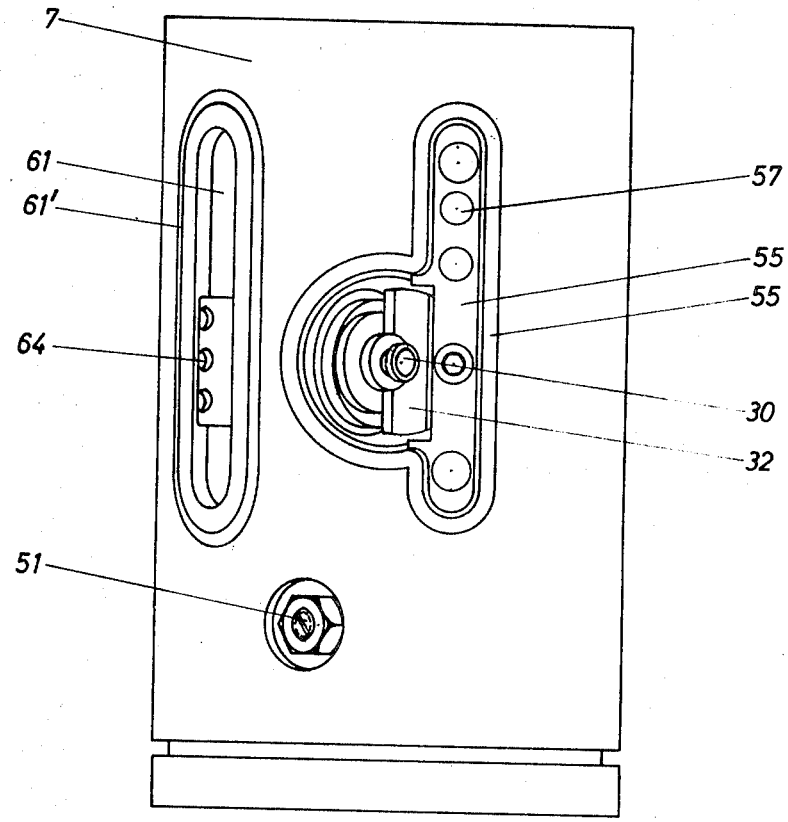
FIG. 7 is an exterior view of the piston showing the arrangement of various components visible externally from one side of the piston, particularly elongated longitudinal flow grooves.

Referring to FIGS. 4-7, pressure fluid to control valve 17 is via two longitudinal grooves 55 and 56, which are recesses cut into the surface of piston 7, sealed by packing 55' and 56', and communicate with each other through transverse bores 57 and 58. The groove 55 (FIGS. 6 and 7) connects to an inlet port or passage 60 (FIG. 6) through a housing bore 59, wherein port 60 is formed in housing 3. An additional longitudinal groove 60, intermediate grooves 55 and 56, FIG. 6, also as seen in FIGS. 4 and 7, is provided for exhaust, sealed by packing 61', and connecting to exhaust port 62 in housing 3.

Thus, pressure fluid feeds to the open ends of control valve 17 via grooves 55 and 56 while exhaust from the control valve to groove 61 is effected through bores 63 and 64, FIGS. 6 and 7, which bores connect to respective annular grooves 65 and 66 formed within valve sleeve 27.

Figure 8:
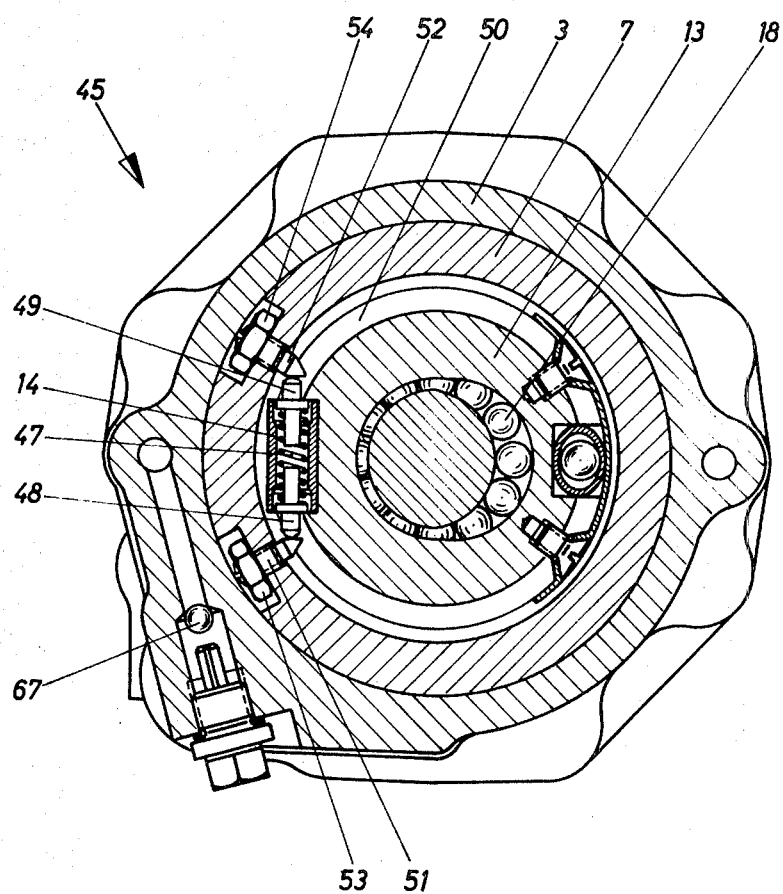
FIG. 8 is a section to a somewhat larger scale on the line VIII—VIII of FIG. 1.

As seen in FIG. 8, a check valve 67 is provided between inlet pressure port or passage 60 and exhaust pressure port or passage 62, within housing 3, for the purpose of providing unimpeded flow of oil between the pressure cylinder chambers 8 and 9 (FIG. 1) in the event of failure of the pressure source, e.g., a servo pump (not shown). Accordingly, steering can then be actuated by manual force with minimum effort.

Pressurizing or exhausting of the pressure chamber 8 (FIG. 1) is effected via valve spool groove 23 (FIG. 5), bore 68 in piston 7, a spacing or gap 69 around ball nut 13, bores 21 in threaded ring 20.

Pressurizing or exhaust of chamber 9 takes place via control valve 17 through the spool valve groove 24, bore 71 in piston 7.

The spool valve 27 is provided with bores 72 and 73 for connection respectively to bores 68 and 71, as seen in FIG. 5.

It will be noted that the open ends of valve sleeve 27 are always open to inlet pressure in respective grooves 55 and 56. Thus, such pressure access is clear from FIG. 5, while FIG. 7 shows the offset rounded extension of groove 55 surrounding the end of sleeve 27 which has reaction piston 30. Groove 56 has a similar shape (not shown).

Referring to FIG. 1, the steering spindle shaft 1 within housing 3 is surrounded by a sleeve 70 secured in cover flange 5 at one end and which has a sliding and sealing fit within piston 7, the seal being accomplished as by the ring seal 75. Chamber 9 is also sealed by sleeve 70 through seal 75 and a seal 74. Chamber 8 is sealed by ring seal 76 within sleeve 70 carried in a groove of the spindle shaft. Bearing 4 is sealed by the ring seal 76' in conjunction with seal 76. Various other packings are shown of a conventional nature, not described in detail.

From the above it will be apparent that pressure chambers 8 and 9 are maintained sealed within housing 3, taken in conjunction with the several conventional housing seals shown in FIG. 1.

Figure 3:
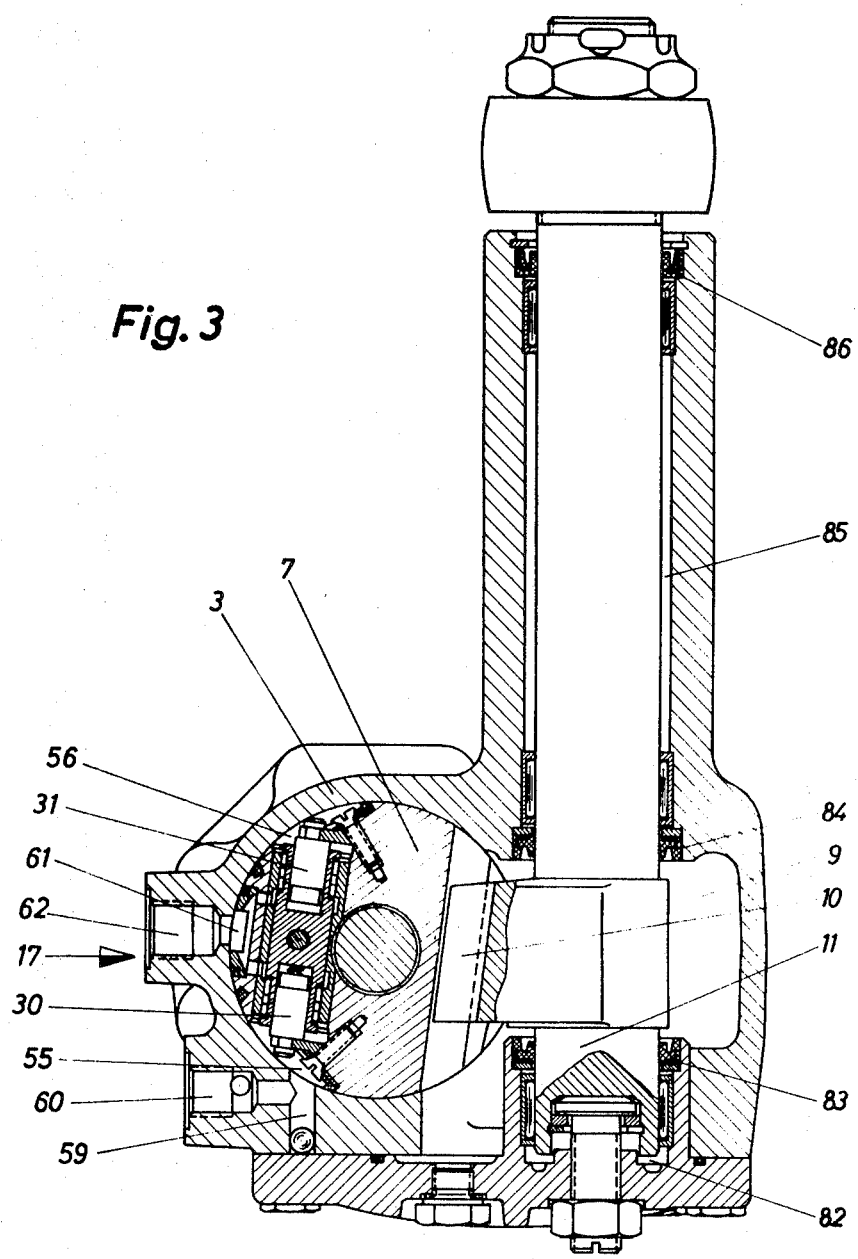
FIG. 3 is a section on the line III—III of FIG. 1.

Referring now again to FIG. 1, in conjunction with FIG. 3, the space 82 at the end of steering gear shaft 11 is sealed from chamber 9 by ring packing 83 and this space communicates with exhaust passage 62 by means of a bore 77, groove 78, bores 79, 80 and 81 for the purpose of relieving leakage pressure at the end of shaft 11. Also, the concentric spacing 85 around shaft 11 is sealed from chamber 9 by a packing 84.

Such spacing 85 connects via bore 81 to the exhaust side of the system by means of a suitable passage connection (not shown), for the purpose of insuring that only exhaust pressure will have access to packing 86 at the outer end of shaft 11.

Referring to the mode of operation of the form of the invention shown in FIGS. 1 and 3-6, when control valve 17 is in centered or neutral position as provided by the centering mechanism 45, the pressure fluid circulates in a substantially pressureless manner from a source (not shown) to the inlet port 60, bore 59, grooves 55 and 56, to the ends of control valve 17. At this time the edges of the spool valve 22 which coact with the adjacent groove inner edges of sleeve 27 are spaced or open and oil flows via grooves 23 and 24 to grooves 65 and 66, bores 63 and 64, groove 61, to return or exhaust port 62. Should the steering spindle be rotated, for example, for a right turn, the ball nut 13 will be turned to the left, with some slight linear movement simultaneously along with the piston since the ball nut is axially locked by bearings 12 and 12' within the piston. However, the ball nut has a slight rotational movement and experiences such movement at this time until stopped by the actuator 14 portion of finger 15 engaging an edge of bore 16. Such action takes place against the respective end of compresses spring 47 of the centering mechanism 45. Valve spool 22 is thus shifted by finger 15 to the extent permitted by the diameter of bore 16. This causes valve spool groove 23 to further open the connection with valve sleeve groove 65, but cuts off the connection between valve spool groove 24 and valve sleeve groove 66. As a result groove 55, with pressure fluid from the inlet port 60 therein is closed, and pressure in the fluid builds up and fluid then flows through groove 56 to groove 24, bore 73 in valve sleeve 27, bore 71, to pressure chamber 9, acting on piston 7 in the direction of the arrow 87 (FIG. 1).

Simultaneously with the above action, chamber 8 is exhausted via bores 21 in threaded ring 20, gap 69, bore 68, bore 72, groove 23, groove 65, bore 63, groove 61, to outlet port 62. Simultaneously the reaction pistons 30 and 31 are subjected to respective pressures of the pressure chambers 8 and 9. For example, with the functioning of the system as explained above, inlet pressure in groove 24 is communicated via bores 42 and 43 to bore 29 and exhaust pressure in groove 23 is communicated via bores 40 and 41 to bore 28. There is thus a differential pressure on the ends of valve spool 22 which opposes the shifting movement in a manner proportional to the steering force applied so that the driver must overcome a simulated steering resistance although to a somewhat lesser extent than would normally be the case without the hydraulic assist of the booster cylinder.

For a left-hand turn, the flow functions described above are reversed as will be apparent to persons skilled in the art due to the symmetry of the passage means arrangement. In such cases chamber 8 is pressurized and chamber 9 is exhausted. However, in any case, chamber 9 is sealed off by the sleeve 70 and the several packings coacting therewith, and the only pressure acting on the sealing packings 76 and 76' is leakage from chamber 8.

Figure 2:
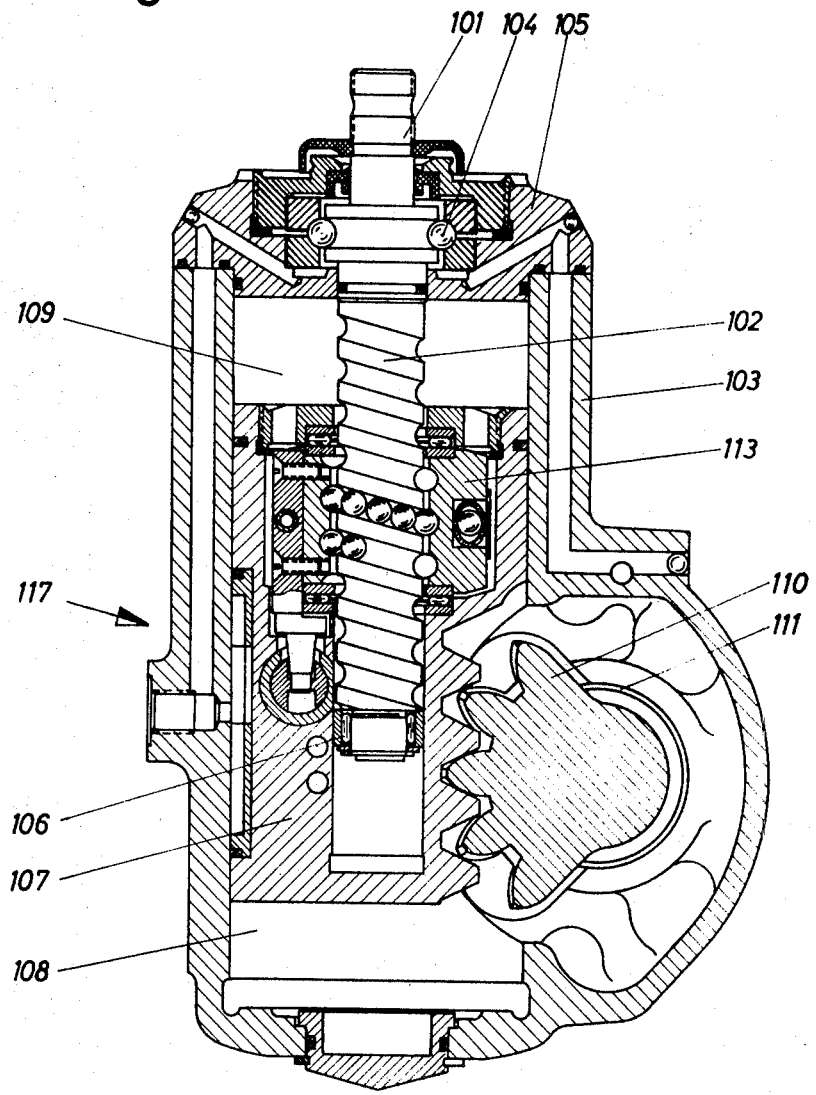
FIG. 2 is a longitudinal cross section of a second construction of the invention.

Referring to the form of the invention shown in FIG. 2, the construction there differs from FIG. 1 in that the relative positioning of the steering mechanism shaft 11 of FIG. 1, and 111 of FIG. 2, is different with respect to the housing. Thus, in FIG. 1, shaft 11 is at a point along the length of the housing 3, which is further from the outer end of the housing than the shaft 111 is with respect to housing 103. In FIG. 2 the construction is thus shortened for use in applications where there is exceedingly small space for the power steering mechanism booster cylinder. It will also be noted that the ball nut 113 is at the opposite end of the piston 107 as compared with FIG. 1, whence the piston has a blind bore for the worm 102 which connects to the spindle shaft coupling 101. In other words, worm 102 works entirely within chamber 109 and the pistons and the bore through the piston is closed off from chamber 108. The gear sector 110 of the steering gear shaft 111 protrudes into chamber 108.

Control valve 117 is carried transversely of the piston axis within the piston on the opposite side of the rack teeth which engage the gear sector, all as in FIG. 1, and all other passage means, such as grooves, bores, etc., remain functionally the same as in FIG. 1 with suitable rearrangement or relocating as required to coact with the positioning of the ball nut as shown in FIG. 2. Also, the modified construction is substantially identical in the use of bearing 104 and cap 105 corresponding to bearing 4 and cap 5 of FIG. 1.

An important feature of the construction shown in FIG. 2 is the use of the bearing 106 at the end of the worm 102 which bearing has an outer race which serves as a sliding guide for the cantilever end of the worm within the axial bore of the piston 107 and effects a very compact and rugged construction.

Figure 9:
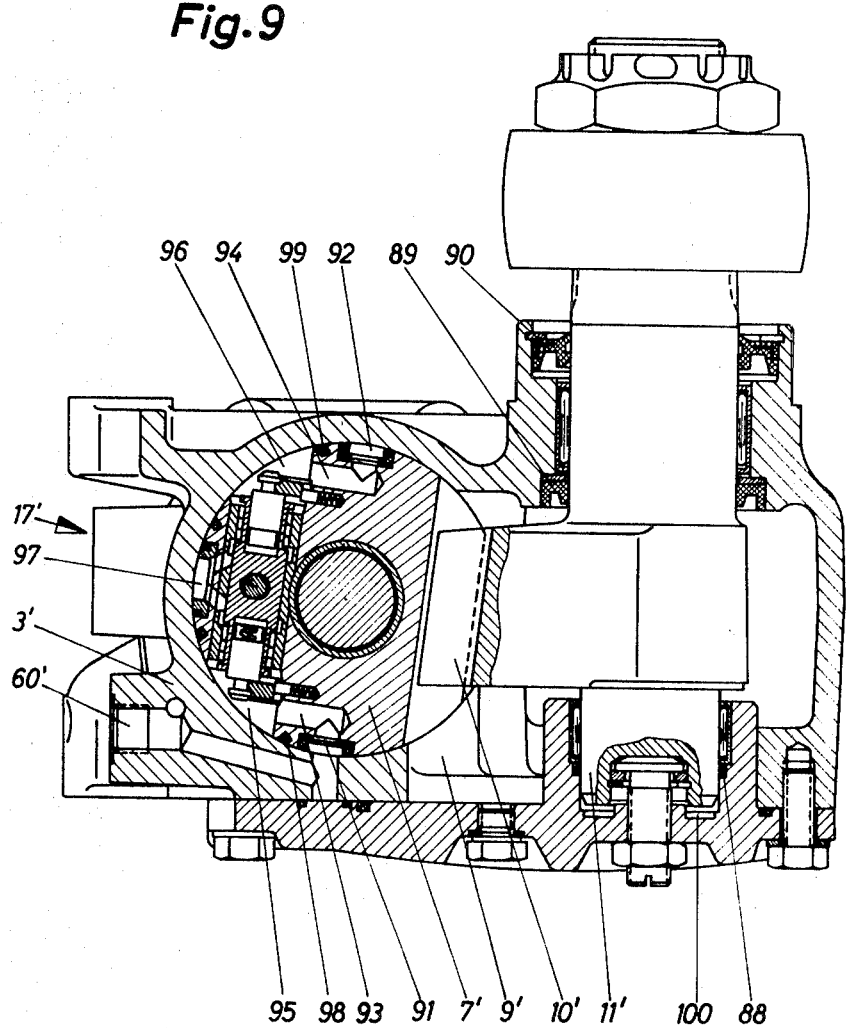
FIG. 9 is a radial cross section through the piston and related components of the mechanism illustrating a modification of certain components.

Referring to FIG. 9, the modification therein is an embodiment functionally the same as those heretofore described but with some change in certain parts. For example, a very short steering gear shaft 11' is utilized, having the gear sector 10' protruding into pressure chamber 9'. The shaft is sealed by packings 88, 89 and 90. Piston 7' is provided with longitudinal grooves 91 and 92 which in this instance are substantially diametrically opposed on the surface of the piston and provide pressure fluid from a source (not shown) to bores 93 and 94, respectively, drilled into the piston which communicate with the ends of the control valve 17' via respective spacings from the cylinder wall effecting chambers 95 and 96. Such chambers are suitably sealed by seals 98 and 99 which could be circular or of a noncircular elongated type each forming a complete loop, for example, of a kind shown in FIG. 7 and 61'. Grooves 91 and 92 are sealed by elongated packings such as 61' of FIG. 7. An exhaust groove 97 is provided in the piston likewise suitably sealed and circumferentially intermediate the grooves 91 and 92 in an arrangement somewhat similar to that shown in FIG. 3.

It will be understood that in addition to the seals 98 and 99 various other seals as shown are utilized for proper sealing of control valve 17' and the grooves 91, 92 and 97. A spacing 100 communicates with exhaust pressure to relieve the end of shaft 11' of pressure due to leakage. This communication with exhaust pressure is effected from exhaust port 60' in the housing 3'.

Figure 11:
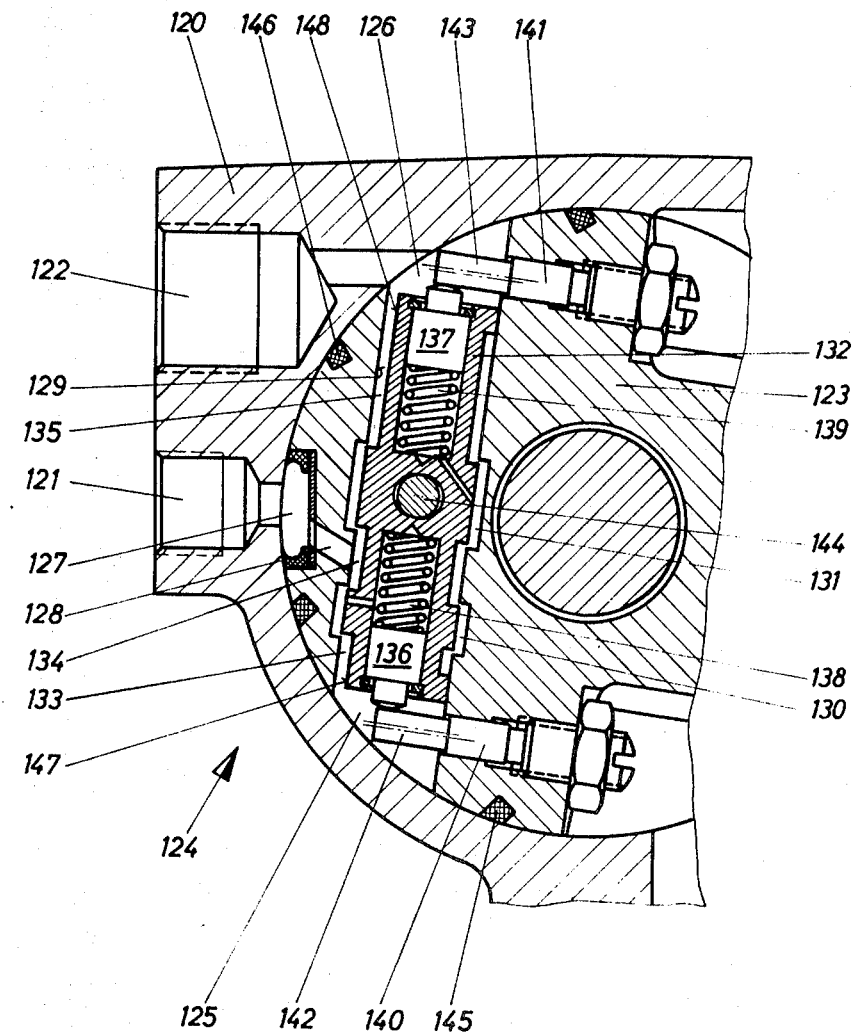
FIG. 11 is a modified construction of the control valve.

Referring to FIG. 11 showing a still further modification of certain of the elements, the housing 120 has an inlet port 121 and exhaust port 122, with a piston 123 carrying the transversely disposed control valve 124, having ends exposed in the chambers 125 and 126. Pressure fluid follows the path afforded by longitudinal groove 127 in piston 123, thence to bore 128 and to control valve 124 at the ends thereof. The control valve comprises the valve spool 132 having grooves 133, 134 and 135 exposed within the offset valve bore 129 drilled directly through the piston similarly, for example, to the valve bores of FIG. 6 or 9. The valve bore is provided with the annular grooves 130 and 131, no valve sleeve being used in this modification. The valve spool 132 has reaction pistons 136 and 137 concentrically disposed therein, each of which has a respective predeterminately compressed spring 138 and 139 which springs serve to center the valve spool 132 against adjusting cams 142 and 143, respectively.

Thus, the reaction pistons and centering device are combined for simplification.

Adjusting screws 140 and 141 act respectively in coaction with the reaction pistons 136 and 137 by virtue of having eccentric portions 142 and 143, respectively, the eccentricity being offset from the axis of the portions to which the numerals 140 and 141 point, or any other type of eccentricity can be provided.

Setting and securing is by the screws and jam nuts shown to properly center the valve spool as well as the ball nut (not shown in this view) via the finger 144 which corresponds to the drive finger 15 of FIG. 1. Chambers 125 and 126 are sealed by means of the respective packings 145 and 146 which can be similar to packing 61' (FIG. 7). The chambers connect to exhaust port 122 via groove 130 for chamber 126 and groove 131 for chamber 125.

The spool valve at 133 communicates with chamber 125 via groove 147 and at passage 135 connects with chamber 126 via groove 148. For straight ahead steering with control valve 124 in neutral position pressure fluid passes from the inlet port 121 via groove 127, bore 128, groove 134, groove 130, passage 133, groove 147, to chamber 125 and simultaneously, for circulatory flow, the pressure fluid exhausts via groove 131, passage 135, via groove 148 and chamber 126 to outlet port 122.

In steering, if spool valve 132 be shifted for a right turn by finger 144 in a manner heretofore described for the actuator 14 in connection with the form of the invention shown in FIG. 1, groove 134 is closed off from groove 130 and groove 131 from passage 135 whence pressureless circulation is blocked. Pressure is then built up in the control valve and pressure fluid then flows via a bore (not shown) into one of the pressure chambers while the other pressure chamber is exhausted via groove 130 and another bore (not shown). From groove 130 pressure fluid passes to passage 133, thence to groove 147 and chamber 125 to outlet port 122 to return to the suction side of the source. For steering in the opposite direction, flow is reversed through the several passage means described. Groove 131 is somewhat broader than groove 130 in order to insure sufficient overlapping of the flow control edges to compensate for the thickness of the actuating finger 144.

We claim:

1. A power-steering mechanism comprising a housing (3) having a cylinder and a double-acting pressure piston (7) therein with a pressure chamber (8, 9) at each end of the piston;

a nut (13) rotatably mounted within the piston and a steering shaft worm (2) extending into the piston and having driving coaction with the nut;

a valve actuator (14) carried by the nut and being disposed within the piston, wherein initial rotation of said worm in a steering movement effects rotation of said nut and rotative motion of said valve actuator about the worm axis;

a control valve (17) carried by the piston and being engaged for reversible movement by said valve actuator; pressure fluid passage means in said control valve, said piston, and said housing for conducting fluid to either chamber to pressurize an end of said piston responsive to movement in a respective direction of said control valve.

2. A mechanism as set forth in claim 1, wherein said control valve (17) comprises a valve spool (22) slideably carried in said piston in a bore transverse of and offset from the axis thereof.

3. A mechanism as set forth in claim 1, said valve actuator (14) comprising an elongated member disposed at one side of the axis of said piston and generally parallel to the axis of said piston;

said piston having rack teeth extending along an opposite side;

a gear sector for a steering mechanism in said housing meshing with said rack.

4. A mechanism as set forth in claim 1, said control valve (17) comprising a valve spool (22) having a bore and said valve actuator (14) having a finger (15) extending into said bore;

a bore in said piston offset from and generally transverse of the axis thereof, and said control valve being carried in said bore of said piston;

said valve actuator being an elongated member extending generally parallel to the piston axis;

said piston having a wall with an aperture (16) through which said valve actuator passes and said aperture being of predetermined diameter larger than the portion of the valve actuator passing therethrough whereby edges thereof serve as a limit of motion in either direction for said valve actuator for controlling the limit of movement of said control valve.

5. A mechanism as set forth in claim 1, including a centering device (45) for said valve actuator (14);
   spring means (47) in prestressed condition disposed to act on said nut, said actuator and said control valve to effect an initial neutral position;
   and adjusting means (51, 52) at opposite ends of said spring means and being adjustable to increase or decrease spring bias reacting against respective adjusting means;
   wherein said adjusting means is carried on said piston so that said spring means can effect force against said adjusting means to rotationally center said nut and thus said valve actuator and control valve relative to a predetermined position.

6. A power-steering mechanism as set forth in claim 1, said piston (7) having a pair of longitudinal grooves (55, 56) for receiving pressure fluid from a source;
   said grooves being connected with each other by transverse bores (57, 58) in said piston;
   said control valve (17) being in a bore of said piston and said bore being open at both ends;
   said control valve comprising flow passages and comprising a valve spool (22) reciprocal in said bore by said valve actuator (14);
   said open ends of said bore communicating with a respective longitudinal groove (55, 56) for entry of pressure fluid into said control valve at both ends of said valve spool; said piston having a third longitudinal groove (61);
   certain of said passage means being in said housing for continuously connecting said piston grooves for pressure fluid and exhaust flow outside said housing and for flow connection to said valve spool;
   said valve spool having certain of said passage means to effect selective flow communication upon reciprocation of said valve spool for flow to and from said pressure chambers (8, 9).

7. A power-steering mechanism as set forth in claim 1, said piston (7) having a pair of longitudinal grooves (55, 56) for receiving pressure fluid from a source;
   said grooves being connected with each other by transverse bores (57, 58) in said piston;
   said control valve (17) being in a bore of said piston and said bore being open at both ends;
   said control valve comprising flow passages and comprising a valve spool (22) reciprocal in said bore by said valve actuator (14)
   said open ends of said bore communicating with a respective longitudinal groove (55, 56) for entry of pressure fluid into said control valve at both ends of said valve spool;
   said piston having a third longitudinal groove (61);
   certain of said passage means being in said housing for continuously connecting said grooves for pressure fluid and exhaust flow outside said housing and for flow connection to said valve spool;
   said valve spool having certain of said passage means to effect selective flow communication upon reciprocation of said valve spool for flow to and from said pressure chambers (8, 9);
   including seals (55', 56', 61') at the surface of said piston surrounding said grooves and coacting with said cylinder to seal said grooves;
   said housing passage means having an inlet port (60) communicating pressure fluid at all times to said first mentioned grooves (55, 56) and also having an outlet port (62) communicating at all times with said third groove (61).

8. A power-steering mechanism as set forth in claim 1, including a pair of reaction pistons (30, 31);
   said control valve (17) comprising a valve spool (22) and said reaction pistons being disposed in respective reaction piston chambers at the ends of said valve spool and having exterior ends secured to said piston;
   a bore in said piston carrying said control valve;
   said passage means comprising valve passages in said control valve (17) for connecting said reaction piston chambers to inlet and outlet pressure passages comprised in said passage means whereby said reaction pistons are thus subjected to inlet or outlet pressure depending upon direction of turn, for imparting simulated steering resistance.

9. A power-steering mechanism as set forth in claim 1, said piston having a blind bore and said worm (102) being disposed in said blind bore, the piston end of said worm having a bearing (106) effecting a slideable sleeve support and rotational support within said blind bore.

10. A power-steering mechanism as set forth in claim 1, said control valve comprising a valve sleeve (27) and a valve spool (22) therein, said piston having a bore in which said valve sleeve is fixed, said sleeve and spool being provided with coacting grooves for directional pressure fluid flow control dependent upon direction of movement of said valve spool and perforate guide means (26) within opposed portions of said spool and sleeve to insure alignment during relative motion therebetween.

11. A power-steering mechanism as set forth in claim 1, including a portion of a steering shaft (1) passing through one (9) of said pressure chambers (8, 9) and means for sealing said portion against pressure in said chamber comprising a sleeve (70) carried by said housing (3) and encompassing said portion and extending into said piston (7) and sealing means (74, 75) surrounding said sleeve to seal the exterior thereof at said piston and at said housing.

12. A power-steering mechanism as set forth in claim 1, said housing having a steering gear shaft (11) extending therein and having an end terminating in said housing;
   said passage means comprising an exhaust pressure passage;
   means (83) sealing said end from pressure fluid in said housing and effecting a chamber for connection to said exhaust pressure passage for relief of leakage of pressure fluid to said end of said shaft.

13. A power-steering mechanism as set forth in claim 1, said passage means comprising inlet and exhaust passages;
   including a check valve (67) between said inlet and exhaust passages and disposed in a bore of said housing (3), to permit reversible flow between the cylinder chambers when said piston is manually operated without pressure flow to the ends thereof.

14. A power-steering mechanism as set forth in claim 1, said control valve comprising a valve spool (132), a bore through said pressure piston (123) in which said valve spool is reciprocal;
   a reaction piston (136, 137) extending into a respective socket in each end of said valve spool and being carried by said valve spool; and said passage means comprising passages (130, 131) to connect said chambers to an outlet (122) pressure passage;
   and said passage means comprising passages to subject said sockets selectively to inlet and outlet passage pressure depending on direction of steering turn for imparting simulated steering resistance.

15. A power-steering mechanism as set forth in claim 14, including a spring (138, 139) in each of said sockets and a wall in said valve spool intermediate said sockets; each said spring acting between said wall and a reaction piston;
   and adjusting means (142, 143) for each spring carried by said piston (123) for prestressing the respective spring to effect a predetermined centered position of said valve spool with respect to said piston whereby said actuator and nut are likewise centered.

16. A power-steering mechanism as set forth in claim 1, a bore in said piston;
   a valve spool in said bore, wherein the surface of said pressure piston is relieved at each end of said bore to effect a reaction piston chamber (95, 96);
   a reaction piston having an end exposed in a respective chamber and carried by said piston;

said relieved portions of said piston having sealing means therearound coacting with the walls of said cylinder;

said passage means comprising passages to conduct pressure fluid to said housing and thence to said first mentioned grooves and communicating with said chambers;

said passage means comprising control valve and housing passages whereby selected positions of said valve spool effect differential pressures at the ends therein in coaction with said reaction pistons for imparting simulated road resistance.

17. A power-steering mechanism as set forth in claim 1, wherein said nut (13) is a ball nut, and a plurality of balls intermediate said nut and said worm (2).

18. A power-steering mechanism as set forth in claim 1, said piston having a transverse bore offset from the axis thereof, said control valve comprising a reciprocal valve spool in said bore, said actuator comprising a drive finger carried by said nut and extending into said valve spool;

and a spring (44) stressed intermediate said piston and said valve spool to maintain driving engagement between said finger and said valve spool.

19. A power-steering mechanism as set forth in claim 1, said nut being socketed at one end of said piston and means axially securing said nut therein while permitting rotational movement comprising a closure plate (20) at said end of said piston to retain said nut;

bores (21) in said closure plate effecting passages for fluid flow to and from the respective pressure chamber and being comprised in said passage means.

20. A power-steering mechanism as set forth in claim 1, said control valve comprising a valve spool having grooves and further comprising a surrounding wall means having coacting grooves, said latter grooves communicating via passages comprised in said passage means with respective pressure chambers;

said piston having a pair of longitudinal grooves communicating at all times with the ends of said valve spool for flow thereto from either longitudinal groove to the coacting grooves of said valve spool and said wall means;

said passage means having passages for conducting pressure fluid from a source to said longitudinal grooves.